United States Patent [19]
Peretz

[11] Patent Number: 5,711,703
[45] Date of Patent: Jan. 27, 1998

[54] METHOD AND APPARATUS FOR REMOVING A FINGER FROM A POULTRY FEATHER PLUCKING DEVICE

[75] Inventor: Amnon Ben Peretz, Kibbutz Ramat Hakovesh, Israel

[73] Assignee: Duram Rubber Products, Kibbutz Ramat Hakovesh, Israel

[21] Appl. No.: 801,649

[22] Filed: Feb. 18, 1997

[51] Int. Cl.[6] .................................................. A22C 21/00
[52] U.S. Cl. ............................................................ 452/92
[58] Field of Search ....................... 452/92, 93; 30/175, 30/180

[56] References Cited

U.S. PATENT DOCUMENTS 2,836,888  6/1958  Hargrove ................................ 30/180
3,943,599  3/1976  Norwood ................................ 452/93
4,998,351  3/1991  Hartmeister ........................... 30/180

FOREIGN PATENT DOCUMENTS 10221  1/1907  United Kingdom ..................... 30/175

Primary Examiner—Willis Little
Attorney, Agent, or Firm—Mark M. Friedman

[57] ABSTRACT

An apparatus for the removal of a resilient poultry feather plucking finger having a shank portion with an enlarged shoulder, a neck portion and an enlarged head portion, into an opening in a rigid finger support. The apparatus includes a locator plate and a blade assembly having a cutting blade, a hydraulic or pneumatic mechanism to displace the blade assembly and cause the blade to close on a finger which is being held by the stationary locator plate as a result of the movement of the blade assembly.

17 Claims, 4 Drawing Sheets

METHOD AND APPARATUS FOR REMOVING A FINGER FROM A POULTRY FEATHER PLUCKING DEVICE

FIELD AND BACKGROUND OF THE INVENTION

The present invention relates to a poultry processing apparatus and, more particularly, to an apparatus for removing fingers from a poultry feather plucking device.

A conventional poultry processing plant includes a feather plucking system which typically includes a series of suitably mounted rigid rotating finger supports, usually in the form of discs. Each of the discs features a number of openings, each of the openings being designed to accommodate a resilient finger. The finger is typically made of rubber or a similar resilient material.

The finger typically includes a shank portion, a head portion and an intermediate neck portion. The bulk of the shank portion is the portion of the finger which comes into contact with the poultry and is of a relatively small diameter (smaller than the disc openings). This portion typically features circular ribs or similar structures which aid in the removal of the poultry feathers. The diameter of the shank portion increases towards the head so the shoulder portion of the shank, i.e., the section of the shank nearest the neck portion, features a diameter which is larger than the disc openings. The neck portion separating the shank and head portions has a diameter which is slightly smaller than the disc opening while the head portion features a diameter which is larger than the disc opening. It is the neck portion which securely seats in the disc opening, with the shank portion of the finger extending forward of the front of the disc and with the head portion remaining at the back surface of the disc. The length of the neck portion is typically substantially equivalent to the depth of the opening in the disc.

In operation, the poultry is passed in some suitable manner near the front of the rotating disc where the fingers are able to come in contact with the feathers. It is the contact of the fingers with the poultry which serves to separate the feathers from the poultry.

In normal use, the resilient fingers tend to tear and otherwise deform, making it necessary to continually replace damaged or torn fingers.

Replacement of a finger typically involves the removal of the damaged or torn finger, usually from the front of the front face of the disc, typically, by first cutting off the front end of the finger to facilitate the easier extraction of the finger from the other end. The head together with the remaining portion of the neck, typically falls away or is then manually pushed in the general direction away from the back face of the disc. The cutting action, which usually is not flush with the neck portion, typically results in a part of the shank having a diameter larger than the opening remaining intact which, in turn, protrudes and secures the finger in the opening. The finger replacement process, especially when more than a few fingers are to be replaced, can be difficult and time consuming.

There is thus a widely recognized need for, and it would be highly advantageous to have, an apparatus for removing fingers from the discs of poultry feather plucking systems which would enable the operator to rapidly and efficiently remove old fingers without the need for the operator to exert large or awkward forces.

SUMMARY OF THE INVENTION

According to the present invention, there is provided an apparatus for removing a resilient poultry feather plucking finger from an opening in a rigid finger support, the finger support having a front and a back face, the finger having a shank portion with an enlarged shoulder, a neck portion and an enlarged head portion, the apparatus including: (a) a body having a locator plate; (b) a blade assembly, pivotally mounted on the body, the blade assembly featuring a blade; and (c) an actuator for pivoting the blade assembly substantially towards the locator plate, the actuator being mounted on the body.

Also according to the present invention, them is provided a method for removing a resilient poultry feather plucking finger, from an opening in a rigid finger support, the finger support having a front face and a back face, the finger having a shank portion with an enlarged shoulder, a neck portion and an enlarged head portion including the steps of: (a) inserting the finger between the blade and the locator plate such that the locator plate is flush with the finger support; (b) applying a force on the apparatus in the direction substantially towards the finger support; and (c) activating the actuator displacing the blade and cutting the finger substantially flush with the neck portion.

According to further features in preferred embodiments of the invention described below, the locator plate is stationary in relation to the body of the apparatus.

According to further features in preferred embodiments of the invention, the blade in the closed position cuts the neck of the finger at a point having the substantially largest diameter of the neck region.

According to still further features in the preferred embodiments, the apparatus further includes a handle connected to the body.

According to still further features in the described preferred embodiments, the locator plate includes a leading edge to situate the apparatus substantially flush with the front face of the finger support.

According to still further features in the described preferred embodiments, the apparatus further includes a reseller coupled to the blade assembly for resetting the blade assembly in a ready position.

According to another embodiment, the apparatus includes an element, mounted on the body, which physically displaces the remainder of the finger once the cutting action is completed.

The present invention successfully addresses the shortcomings of the presently known configurations by providing an apparatus for removing fingers from the discs of poultry feather plucking systems which enables the operator to rapidly and efficiently remove old fingers without the need to exert large or awkward forces.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an apparatus and method which can be used to remove a finger from a poultry feather plucking device.

The principles and operation of a finger removing apparatus according to the present invention may be better understood with reference to the drawings and the accompanying description.

Figure 1:
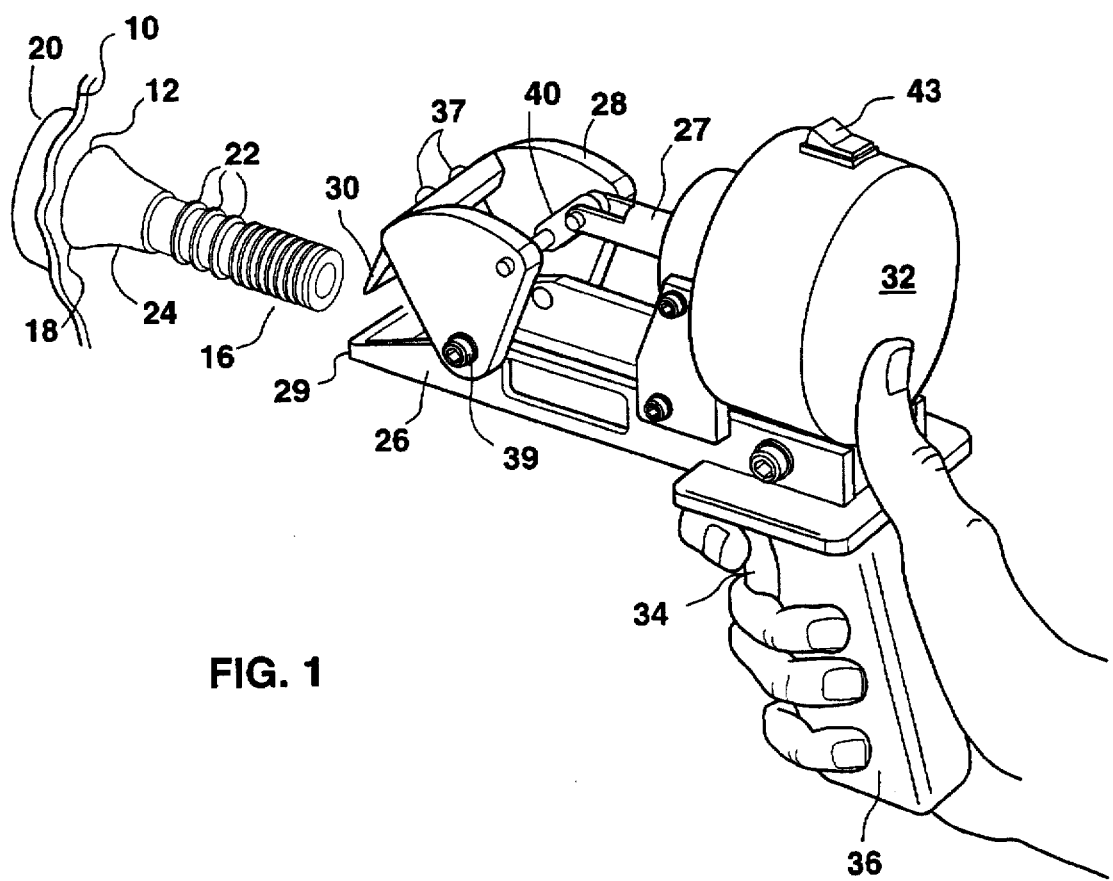
FIG. 1 is a perspective view of the finger removing apparatus in a ready position.

Referring now to the drawings, FIG. 1 illustrates the basic components of an illustrative embodiment of an apparatus according to the present invention. Before describing the embodiments (shown in FIGS. 1 to 5) of an apparatus according to the present invention, it is useful to describe a typical poultry feather plucking system, in general, and a finger which might be used in such a system, in particular.

Figure 2:
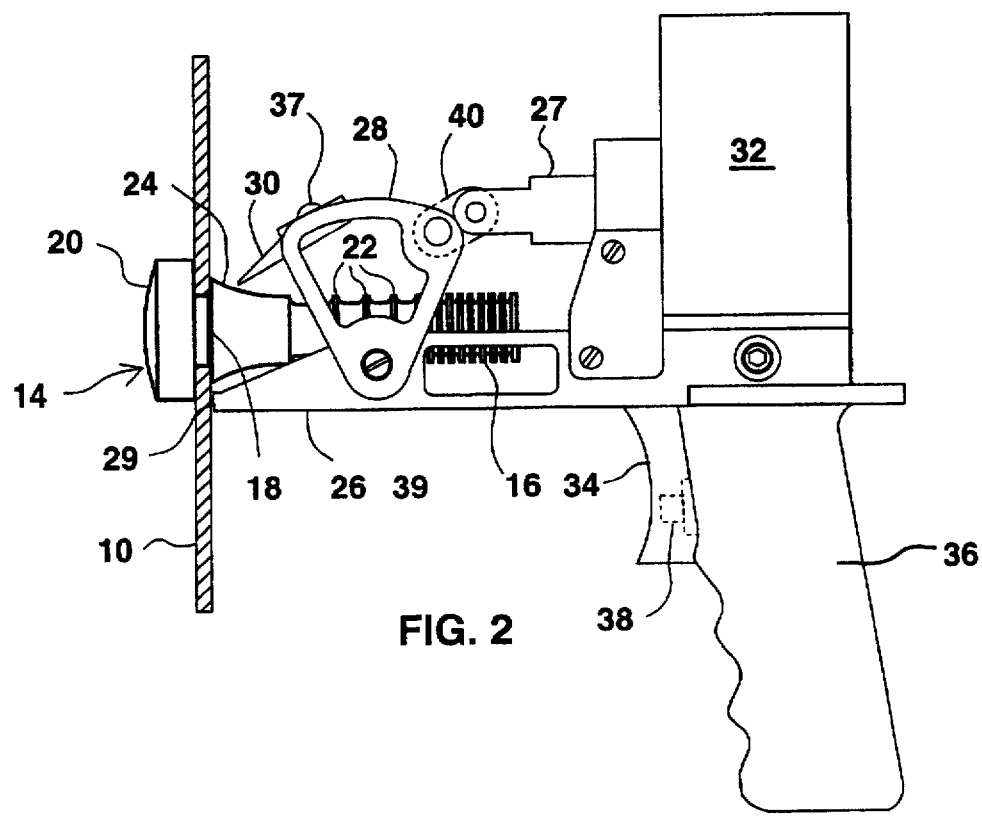
FIG. 2 is a side view of the finger removing apparatus in the ready position prior to the cutting action being completed.
Figure 3:
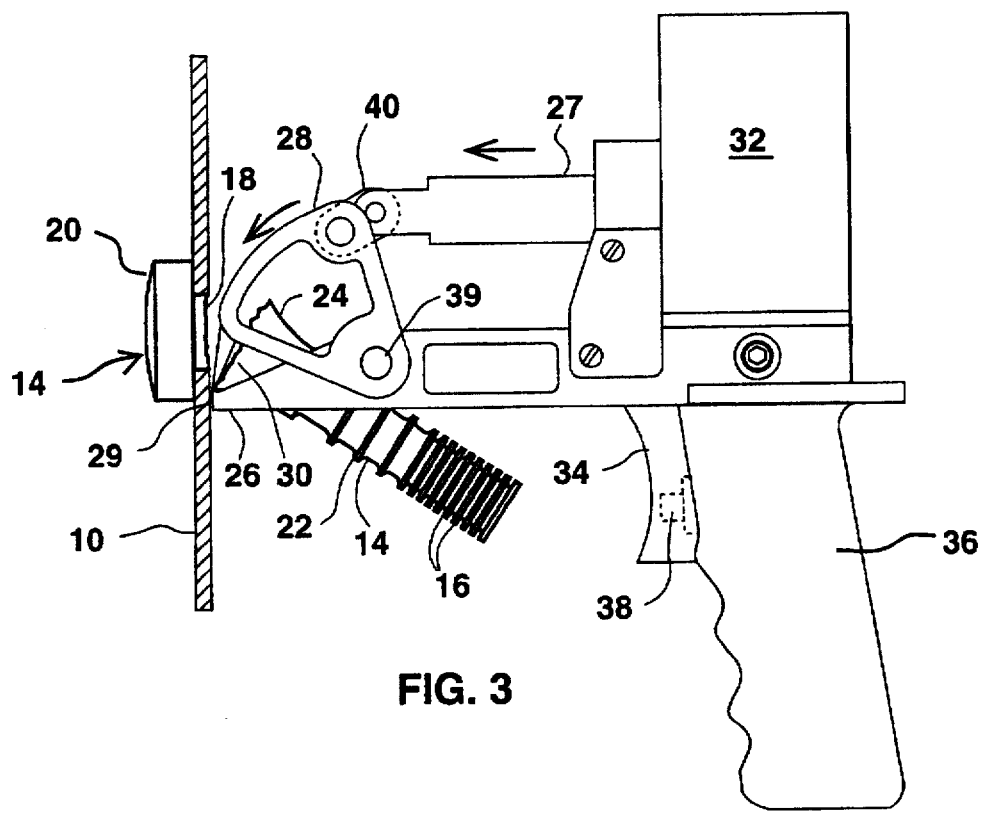
FIG. 3 is a side view of a finger removing apparatus in the closed position after the cutting action has been completed.

A feather plucking system typically includes a number of rotatable rigid finger supports, one of which, designated 10, is shown in partial view in FIGS. 1–3. Finger support 10 typically includes a plurality of openings therethrough, one of which, designated 12, is shown in FIGS. 1–3. Each opening 12 is sized and dimensioned to accommodate a single finger 14.

Finger 14 can be described as having three integrally formed sections—a shank 16, a neck 18, and a head 20. Most of shank 16 is dimensioned to fit easily through opening 12. The thin end of shank 16 is the portion of finger 14 which comes into contact with the feathers of the poultry. It is this portion of finger 14 which typically features circular, or similar, ribs or similar structures 22 which aid in removing the feathers from the poultry.

The diameter of shank 16 increases in shoulder region 24 near neck 18 so the diameter of shank 16 adjoining neck 18 is larger than opening 12. Head 20 has a diameter which is larger than opening 12. Neck 18, which separates shank 16 and head 20 has a diameter which is slightly smaller than opening 12 and a length substantially equivalent to the depth of opening 12. It is neck 18 which snugly seats in opening 12 when finger 14 is properly mounted onto finger support 10. When finger 14 is properly mounted, shank 16 extends beyond the front face of finger support 10 while head 20 remains tightly adjacent to the back face of finger support 10.

Since neck 18 is slightly smaller than opening 12, finger 14 remains securely and snugly mounted in its position with head 20 extending from the back face of finger support 10 and shank 16 extending from the front face of finger support 10.

According to the present invention, finger 14 is cut and removed using a unique and novel apparatus. An apparatus according to the present invention includes a body having a locator plate 26 and a blade assembly 28 pivotally mounted on the body, the blade assembly 28 featuring a blade 30. Blade assembly 28 is pivotally mounted on the body through a pivot 39. Blade assembly 28 and locator plate 26 are complementary in that when blade 30 approaches locator plate 26, blade 30 and the end of locator plate 26 create a shear which cuts finger 14. Typically, the shearing action is achieved when blade 30 and locator plate 26 are adjacent and perpendicular to each other. Typically, finger 14 is made of hard rubber which is not easily sheared thus an effective way for cutting finger 14 is when locator plate 26 is substantially stationary in relation to the body of the apparatus.

Blade assembly 28 is directly or indirectly connected to a suitable actuator 32 for setting blade assembly 28 in a ready position closing blade 30 against the end of locator plate 26 by pivoting blade assembly 28 substantially towards locator plate 26, whereas actuator 32 is mounted on the body. Preferably, actuator 32 is selected from the group consisting of a hydraulic mechanism, a pneumatic mechanism and an electrical mechanism.

Preferably, blade 30 in the closed position cuts finger 14 at the point of neck 18 having the substantially largest diameter of neck 18.

More preferably, finger 14 is inserted between blade 30 and locator plate 26 such that locator plate 26 is flush with finger support 10, then applying a force on the apparatus in the direction substantially towards finger support 10 and activating actuator 32 displacing blade 30 and cutting finger 14 substantially flush with neck 18.

More preferably, locator plate 26 includes a leading edge 29 to situate the apparatus substantially flush with front face of the finger support 10.

Even more preferably, leading edge 29 situates the apparatus substantially flush with the opposite side of neck 18 when blade 30 cuts finger 14 substantially flush with the area of neck 18 having the substantially largest diameter of neck 18.

Even more preferably, blade 30 comes into contact with finger 14 when locator plate 26 is substantially adjacent to opposite side of finger 14 and locator plate 26 is substantially adjacent to finger support 10.

Preferably, the apparatus further includes a reseller coupled to the blade assembly for resetting blade assembly 28 in a ready position. Preferably, the reseller is also hydraulically or pneumatically activated, most preferably, by same actuator 32 used for the actuating of blade assembly 28.

Actuator 32 may be activated, for example, through the pulling of a trigger 34 which is conveniently located on a handle 36 which is also used to hold the apparatus. Trigger 34 may be designed to depress activating member 38 (FIGS. 2 and 3) when it is pivoted towards handle 36, which causes shaft 27 to be displaced in a substantially forward direction, and when trigger 34, which is preferably anteriorly biased, is released, shaft 27 is moved substantially rearwardly to reset blade assembly 28.

Figure 4:
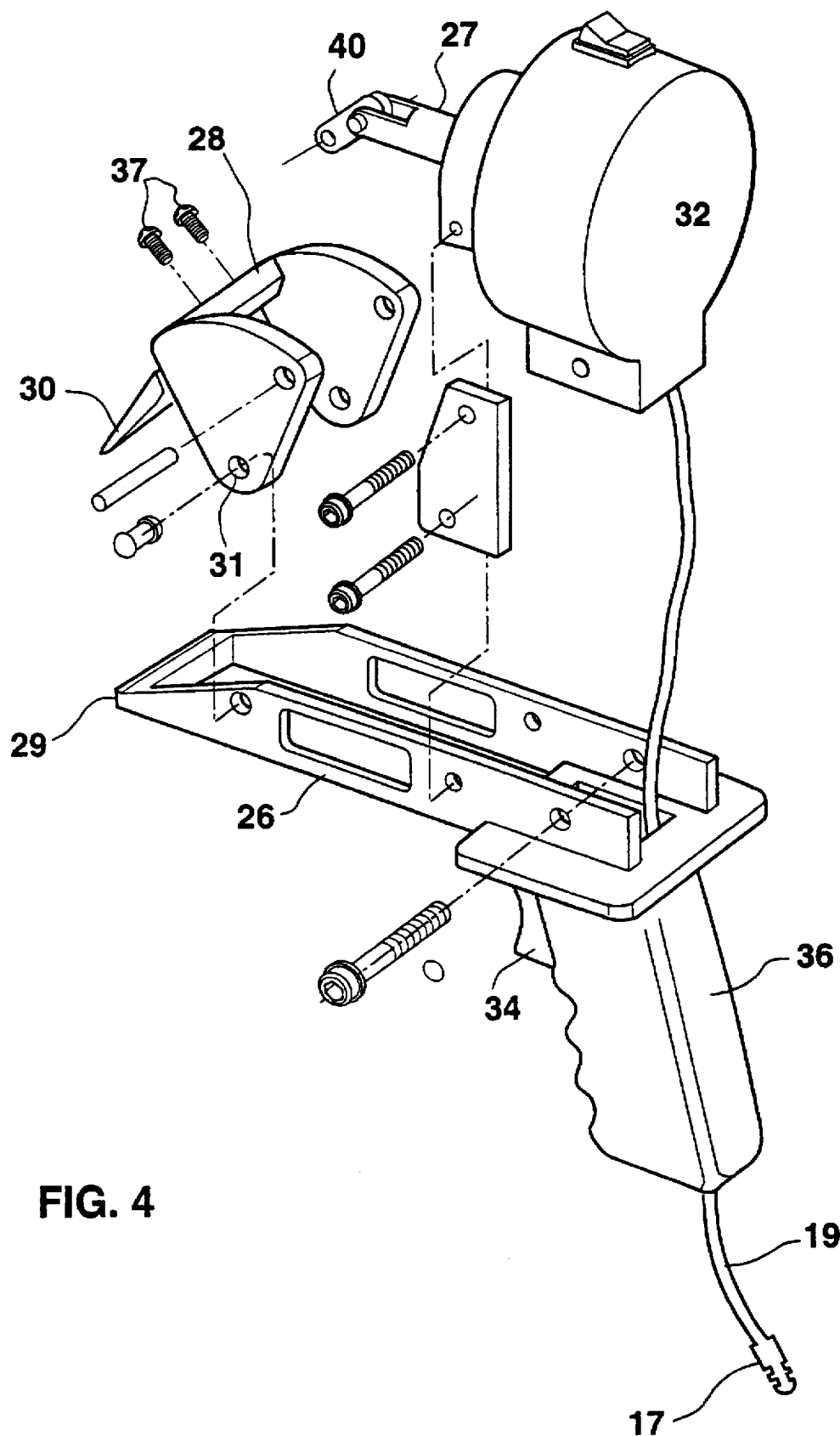
FIG. 4 is a perspective exploded view of some of the components of the finger removing apparatus.

Preferably, an apparatus according to the present invention includes a hydraulic or pneumatic connector tube situated in handle 36, one of which, designated 19, is shown in perspective exploded view, in FIG. 4.

Preferably, an apparatus according to the present invention includes a quick hydraulic or pneumatic connector attached to an end of hydraulic or pneumatic connector tube 19, one of which, designated 17 is shown in perspective exploded view, in FIG. 4.

Preferably, an apparatus according to the present invention includes a master power switch, one of which designated 43, is shown in perspective view in FIGS. 1 and 4.

Preferably, an apparatus according to the present invention includes a coupler 40, the purpose of which is to act as a hinge to enable blade assembly 28 to be displaced in an arc towards locator plate 26 and facilitate the cutting action. Preferably, coupler 40 is directly or indirectly connected to, and is displaceable by, actuator 32. Blade assembly 28 is mounted on, and pivotable about, coupler 40.

An apparatus according to the present invention includes a blade assembly 28 which is coupled to locator plate 26 with pivot 39 on which blade assembly 28 may be displaced in a arc. When shaft 27 moves forward, blade assembly 28 and blade 30 are displaced in an arc and blade 30 is brought to a closed position which is substantially adjacent, and substantially perpendicular to locator plate 26. Blade 30 and locator plate 26 act together to produce a shear to cut off finger 14 at the point having the substantially largest diameter of neck 18 and enabling the efficient removal of finger 14.

More preferably, blade 30 is detachably mounted on blade assembly 28 to facilitate the replacement of blade 30 when it is damaged or worn. Blade 30 may be attached to blade assembly 28 with at least one replaceable screw, two of which, designated 37 may be seen in FIG. 1.

Figure 5:
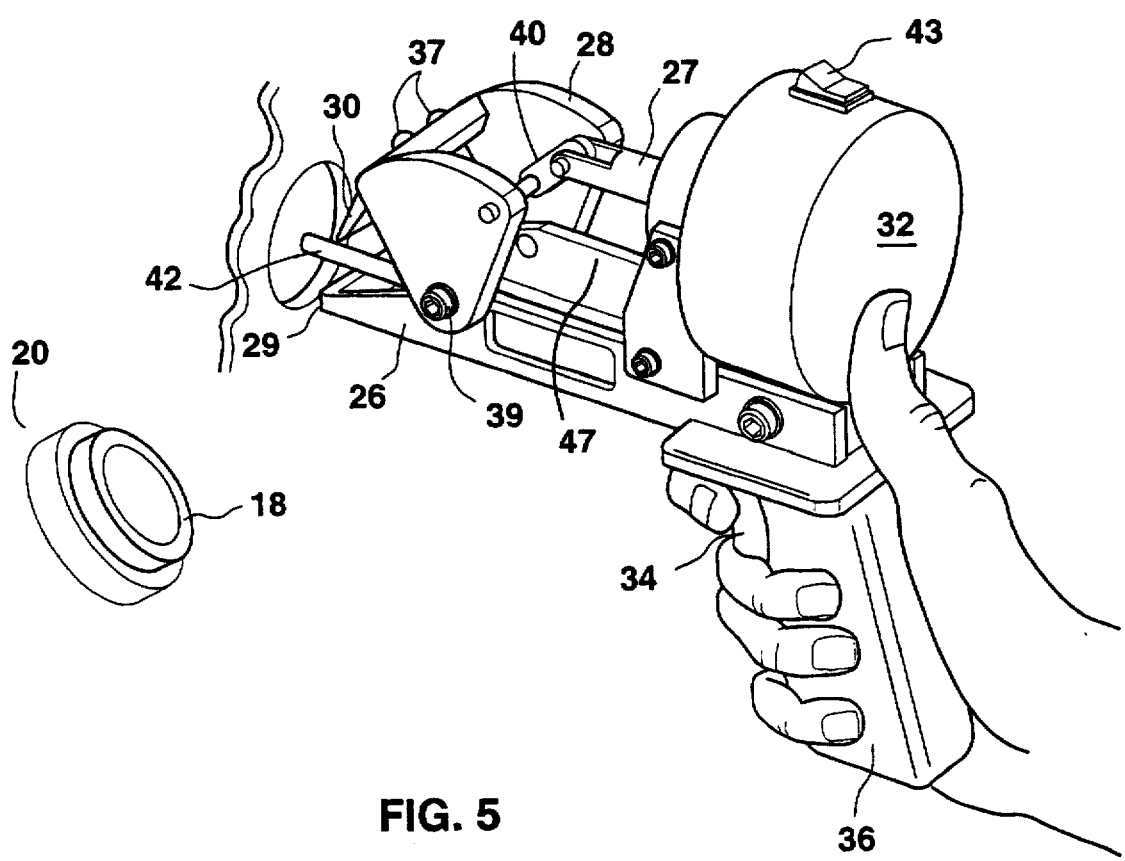
FIG. 5 is an alternative design of the finger removing apparatus having an element which actually pushes and displaces the remainder of the finger clear of the opening in the disc once the cutting action has been completed.

Another possible configuration is shown in FIG. 5, wherein the apparatus includes an element, mounted on the body, which physically displaces the remainder of finger 14 once the cutting action is completed.

Preferably, actuator 32 having a hydraulic or pneumatic mechanism has a strong power stroke which displaces shaft 27 in a forward direction and a weak power stroke which displaces a bar 47 which, in turn, displaces a spike 42 coupled thereto which physically displaces remainder of finger 14 from opening 12 after the cutting action is completed.

While the invention has been described with respect to a limited number of embodiments, it will be appreciated that many variations, modifications and other applications of the invention may be made.

What is claimed is:

1. An apparatus for removing a resilient poultry feather plucking finger from an opening in a rigid finger support, the finger support having a front and a back face, the finger having a shank portion with an enlarged shoulder, a neck portion and an enlarged head portion, the apparatus comprising:
   (a) a body having a locator plate;
   (b) a blade assembly, pivotally mounted on said body, said blade assembly featuring a blade;
   (c) an actuator for pivoting said blade assembly substantially towards said locator plate, said actuator being mounted on said body; and
   (d) an element mounted on said body which physically displaces the remainder of the finger once cutting action is completed.

2. The apparatus of claim 1, wherein said locator plate is stationary in relation to said body of the apparatus.

3. The apparatus of claim 1, wherein said blade in a closed position cuts the neck of the finger at a point having a substantially largest diameter of the neck region.

4. The apparatus of claim 1, further comprising a handle connected to said body.

5. The apparatus of claim 4, further comprising a quick connector at an end of a connector tube situated in said handle.

6. The apparatus of claim 1, wherein said locator plate includes a leading edge to situate the apparatus substantially flush with the front face of the finger support.

7. The apparatus of claim 1, wherein said blade when in a closed position, is substantially adjacent and substantially perpendicular to said locator plate.

8. The apparatus of claim 1, wherein said blade is detachably mounted on said blade assembly with a replaceable screw.

9. The apparatus of claim 1, wherein said apparatus further includes a resetter coupled to said blade assembly for resetting said blade assembly in a ready position.

10. The apparatus of claim 4, wherein said apparatus further includes an activating member mounted on said handle.

11. The apparatus of claim 1, wherein said apparatus further includes a master power switch situated on the apparatus.

12. The apparatus of claim 1, wherein said locator plate further includes a leading edge to situate said apparatus substantially flush with an opposite side of the neck portion when said blade cuts the neck of the finger at a point having a substantially largest diameter of the neck.

13. The apparatus of claim 1, wherein said actuator is selected from the group consisting of a hydraulic mechanism, a pneumatic mechanism and an electrical mechanism.

14. The apparatus of claim 13, wherein said actuator includes a strong power stroke which displaces said blade assembly in a substantially forward direction, and a the weak power stroke which displaces a bar which, in turn, displaces a spike coupled thereto for physically displacing the remainder of the finger after cutting action is completed.

15. A method for removing a resilient poultry feather plucking finger, from an opening in a rigid finger support, the finger support having a front face and a back face, the finger having a shank portion with an enlarged shoulder, a neck portion and an enlarged head portion comprising the steps of:
   (a) providing an apparatus which includes:
      (i) a body having a locator plate;
      (ii) a blade assembly, pivotally mounted on said body, said blade assembly featuring a blade;
      (iii) an actuator for pivoting said blade assembly substantially towards said locator plate, said actuator being mounted on said body; and
      (iv) an element mounted on said body which physically displaces the remainder of the finger once cutting action is completed;
   (b) inserting the finger between said blade and said locator plate such that said locator plate is flush with the finger support until said element physically displaces the remainder of the finger;
   (c) applying a force on said apparatus in the direction substantially towards the finger support; and
   (d) activating said actuator displacing said blade and cutting the finger substantially flush with the neck portion.

16. The method of claim 15, wherein said apparatus further includes a master power switch which is activated by the operator prior to the step (d) of claim 15.

17. The method of claim 15, wherein said blade comes into contact with the finger when said locator plate is substantially adjacent to opposite side of the finger and said locator plate is substantially adjacent to the finger support.

* * * * *